(No Model.)
T. J. TYLER.
CORD FASTENER.
No. 402,786. Patented May 7, 1889.
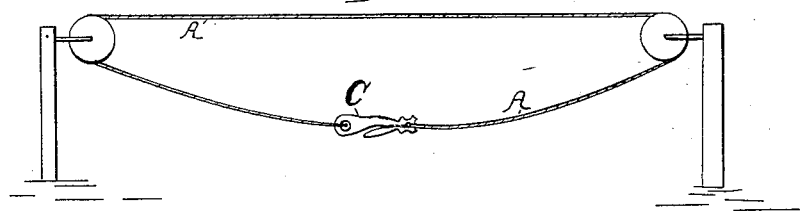
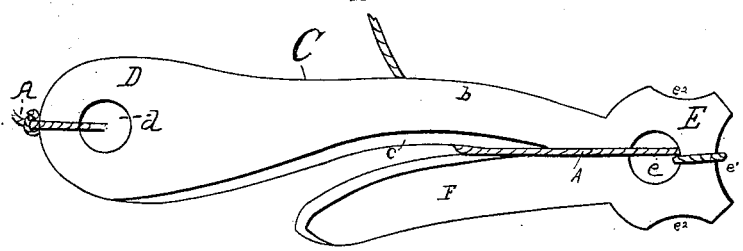
WITNESSES,
L. S. Bacon
H. L. Davis
INVENTOR,
Thomas J. Tyler
By M. V. Tierney
Attorney.

UNITED STATES PATENT OFFICE.

THOMAS J. TYLER, OF YONKERS, NEW YORK.

CORD-FASTENER.

SPECIFICATION forming part of Letters Patent No. 402,786, dated May 7, 1889.

Application filed November 28, 1888. Serial No. 292,109. (No model.)

*To all whom it may concern:*

Be it known that I, THOMAS J. TYLER, a citizen of the United States, residing at Yonkers, in the county of Westchester and State of New York, have invented certain new and useful Improvements in Cord-Fasteners; and I do hereby declare the following to be a full, clear, and exact description of the invention, such as will enable others skilled in the art to which it appertains to make and use the same.

My invention relates to an improvement in cord or rope fasteners; and it consists in the construction and arrangement of the several parts thereof, which will be more fully hereinafter described, and definitely pointed out in the claim.

The object of my invention is to provide a fastening device for cord or rope used as clothes-lines, one which will permit of the union of the two ends in a quick, easy, and permanent manner.

In the accompanying drawings, forming part of this specification, like letters of reference indicate similar parts in both views.

Figure 1 is a view showing my device attached to a clothes-line, and Fig. 2 is a detail view of the fastener.

In the drawings, A represents a clothes-line passing over pulleys, and C represents the fastener, which is formed of metal or any other suitable material, cast or stamped, as may be most advantageous.

The fastener C is formed with an enlarged end, D, in which is made a hole or opening, $d$, through which one end of the line A passes, and is secured to the fastener. The opposite end of the fastener tapers somewhat, and is curved, as at $b$, its end terminating in a knob or in a substantially rectangular head, E. In the head E is formed an opening, $e$. The outer and side edges, $e'$ and $e^2$, of the head are grooved or curved inwardly, to form seats or rests for the rope, in a manner hereinafter stated. The under edge of the fastener is beveled, forming a sharp or biting edge, as $c$.

F represents a tongue or arm, which extends outward from the head or end of the fastener at an angle thereto, thus forming a crotch, with a space between the beveled edge of the fastener and the arm F. The edge of the arm opposite the beveled edge $c$ is also beveled. The space between the arm and edge $c$ is decreased in width until it terminates in a narrow space at the union of the two parts.

To fasten the cord or line, the end is inserted or passed through the opening in the head E. It may then be turned or wound around the outer side of the head, the groove $e'$ forming a secure rest for the coil, and then carried down and drawn into the apex of the opening between the edge $c$ and the arm, the biting-edges retaining the end in this position, the strain on the rope being transferred to the head, thus preventing the edges from cutting the rope.

In securing the rope, it may be arranged in numerous ways, the grooves $e^2$ in the sides of the head permitting the rope to be placed or coiled on either or both the sides, as well as on the end.

The advantages I derive by the use of my device are those which enable one to quickly take up slack or loosen a line with but little trouble and to quickly unite both ends.

I am aware that minor changes in the construction of my device can be made in lieu of that shown and described without departing from the nature of my invention.

Having thus described my invention, what I claim as new, and desire to secure by Letters Patent, is—

The fastener C, consisting of the body portion having the rectangular head E, with grooved sides $e'$ and $e^2$ and an opening in its center, the arm F, extending out from the head, having a biting-edge, $c$, on the fastener opposite said arm, substantially as described.

In testimony whereof I affix my signature in presence of two witnesses.

THOMAS J. TYLER.

Witnesses:
JOHN CAREY,
JOHN SCOTT.